UNITED STATES PATENT OFFICE.

HERMANN SCHULZE-BERGE, OF PITTSBURG, PENNSYLVANIA, ASSIGNOR OF ONE-HALF TO JESSE H. LIPPINCOTT, OF SAME PLACE.

PROCESS OF ETCHING AND DECORATING GLASSWARE, AND DEVICES THEREFOR.

SPECIFICATION forming part of Letters Patent No. 283,423, dated August 21, 1883.

Application filed November 8, 1882. (No specimens.) Patented in Germany January 23, 1883, in England May 4, 1883, in France May 15, 1883, and in Belgium May 16, 1883.

*To all whom it may concern:*

Be it known that I, HERMANN SCHULZE-BERGE, of Pittsburg, in the county of Allegheny and State of Pennsylvania, have invented a new and useful Improvement in Processes of Etching and Decorating Glassware, and Devices therefor; and I do hereby declare the following to be a full, clear, and exact description thereof.

This invention is a modification of certain inventions in etching and decorating glassware invented by me, and described in two specifications executed herewith; and it consists in an improved method of applying the tracing, drawing, or pattern to the surface of the glassware to be etched by means of the action of fluorine, which, under certain conditions described in those specifications, forms a chemical union with the silica of the glass, and produces the effect known as "etching."

The use of fluorine for etching glass has long been known, but has been, previous to my invention, confined to the application of liquid hydrofluoric acid to those portions of the glass which are to be etched, the other portions of the glass surface being stopped off or protected from the action of the hydrofluoric acid by means of wax, or other substances capable of resisting the action of the acid. By the improvement invented by me, and described in my other specifications just referred to, instead of using liquid hydrofluoric acid I use the fluorides of alkalies, which are solids, such as fluoride of sodium, fluoride of calcium, &c. These are reduced to a finely-comminuted condition, and applied to the surface of the glass by being either dissolved in water and laid on with a brush, pen, or stamp; or the pattern is printed, traced, or drawn on the glass with a mixture of such powdered fluorides and some vehicle, such as Venice turpentine; or the tracing or drawing is made on the surface of the glass with the Venice turpentine, or other suitable substance, and while the lines of the drawing or tracing are still in a moist or sticky condition the powdered fluoride or mixture of fluorides is dusted over the surface of the glass, adhering only to the lines or drawing so made thereon. The glass so prepared is then placed in a furnace, which is gradually heated, so as first to vaporize the volatile portions of the vehicle, then the heat is gradually increased until it chars and burns away the organic matter, and, lastly, the heat is further augmented until the desired reaction takes place between the fluorine and the silica of the glass, whereby the desired etching effect is produced; or, as a modification of the last step of the heating process, after the fluoride has been applied to the surface of the glass in the required drawing or design the glass so prepared is subjected to the action of the heated vapor of sulphuric acid, which causes the required reaction to take place.

My present invention has reference to the application of the fluorides to the surface of the glass, after which the prepared glass is to be subjected to the action of heat in a furnace, or to the hot vapor of sulphuric acid, as described in my other specifications hereinbefore referred to. For this purpose I print or draw upon a sheet of paper, or other material specially prepared for that purpose, as hereinafter described, the required lines, letters, figures, or drawing, with a fluid or semi-fluid mixture containing in suspension or in mixture any of the chemical combinations of fluorine, such as fluoride of ammonium, fluoride of sodium, or fluoride of calcium. The sheet thus prepared is then applied to the surface of the glassware to be etched in such a manner as to adhere thereto, and the substance of the sheet on which the design or pattern is painted or printed is removed, either by means of wetting it with water or by burning it off, so as to leave behind, attached to the surface of the glass, the lines composing the pattern or design in the shape of a thin deposit of fluoride. The glassware is then subjected to the requisite process for producing a reaction between the fluorine of the design and the silica of the glass, so as to produce the same design or pattern etched on the surface of the glass.

In order that my invention may be understood by those skilled in the arts referred to, I will proceed to describe, first, the mode of preparing the sheet to receive the transfer picture or design; next, the mode of preparing the ink with which the design, picture, or pattern is to be printed, painted, or sketched on the sheet, and then the mode of applying the transfer picture or design to the article of glass or china ware to be decorated.

The selection of the basis of the sheet on which the picture or design is to be produced will depend upon whether it is to be removed from the article to be etched by wetting or by burning. If by wetting, then a thin paper is used, which should be either unsized or have very little sizing in it. This paper is then covered with a thin film of some mucilage which is soluble in water. When the mucilage is dry, a thin film of collodion (etherial solution of pyroxyline) or of resin dissolved in ether is applied, and when the film of collodion or resin is dry the desired picture or design is painted or printed thereon. The object of using the mucilage as the first coating of the paper, and the collodion or resin as the second, is that the paper may be removed after it has been applied to the surface of the glass or china by means of water, which will not dissolve the second coating, to which the picture or design is directly applied, and that such second coating may be removed by the subsequent application of heat, so as to leave the design as a thin film of fluoride on the surface to be etched or decorated.

As it is a delicate and rather difficult operation to remove the paper from the surface of the glass by the wet process without in any way blurring or defacing the design deposited thereon, a basis or substratum for the picture or design may be made of some substance which can be burned off without disturbing the film constituting the design. Ordinary paper, whether thick or thin, sized or unsized, cannot be used where the sheet is to be burned off, because paper, when exposed to heat sufficient to char it, curls or shrivels up, while still partially adherent to the surface to which it is attached, and in so doing disturbs the film composing the design, causing it to move on the surface of the glass or china and partially detaching it. There is a species of paper, however, known in the trade as "Japanese fiber paper," which is very thin and yet sufficiently strong to serve my purpose. On this fiber paper the design, picture, or pattern may be ordinarily printed, painted, or sketched without any preparation; but this paper should be as thin as possible, so as to produce the minimum of ash in burning, as there is danger of the ash melting on the surface of the glass and discoloring it. If this fiber paper is so thin that the interstices between its fibers will not permit of its receiving the drawing or design perfectly, it may receive a very thin coating of some substance which will fill up the interstices and give a smooth surface to receive the design—such, for example, as collodion, resin, fat, starch, mucilage, gelatine, or other substance. If starch, mucilage, or gelatine are used for this purpose, they must be applied in a very thin film, as they are apt to form a cuticle through which the volatile portions of the varnish used to apply the picture will not pass, and in that case they will blister and injure the design. I have found a mixture of collodion and resin to answer this purpose satisfactorily, as the addition of resin makes the fiber paper tougher and more pliable, preventing the sheet from wrinkling, while the film thus composed is easily removed by vaporization without disturbing the design. Collodion itself forms a suitable sheet for receiving the transfer pictures or designs; but in order that the pictures may bear handling, so as to be sold by the trade as articles of manufacture, the collodion should be spread upon a base of some fibrous vegetable tissue—such, for example, as sheets (like paper) made of fine cotton fibers or very thin gauze or blonde made of cotton or silk—care being taken that the threads of which it is composed are of uniform thickness and not strongly twisted, as thick or strongly-twisted threads are apt to separate when burning and spoil the pattern. Sheets may also be made of such fine reticulated fibrous substance the interstices of which are filled up with varnish, starch, gelatine, or fatty matter, so as to form a surface capable of receiving the design, but which can be melted or evaporated or charred by heat.

To cover the sheets of Japanese fiber paper or sheets of other vegetable textile fiber with a thin film of collodion or mixture of collodion with additions of some resinous substances dissolved in ether, or other suitable substances by which thin and combustible films are formed, the sheets of textile fiber are stretched upon a frame, and the collodion, &c., is applied by a sponge or brush. This has to be performed quickly, because the sheet gets somewhat soft when covered with the etheric solution. The sheets have to get thoroughly dry on the frame to prevent them from wrinkling.

In place of covering the sheets with the thin film of combustible substance upon the frame, the following way will give equally good results with less trouble:

The sheet is spread upon a pane of glass and covered with collodion, &c., by means of a sponge or brush. After the ether has evaporated and the sheet has become entirely dry the pane of glass and sheet are immersed from five to fifteen minutes in water. By this means the fiber paper with film will separate from the glass, and after drying the water from the sheet the latter may be used.

It has to be mentioned that if the film upon the fibrous sheet is produced with collodion only, such sheet separates readily from the glass when immersed in water, but wrinkles easy afterward. A small addition of resinous substance prevents the wrinkling. Sheets so treated have to be immersed somewhat longer in water. Sheets covered with a film produced only by a solution of resin in ether have to remain in the water quite a long time. Films of collodion or of collodion with resin can be prepared in this way without the strengthening fibrous sheet; but such films are extremely frail, and do not stand well for printing, handling, and dealing with. On the sheet thus prepared the desired picture or design is to be sketched, painted, or printed with an ink suitable for the desired purpose.

The ink with which the desired design or picture is to be printed or sketched on the prepared sheet is composed of the fluoride of an alkali or a mixture of fluorides either dissolved in water or mixed with some suitable vehicle. The fluoride which I prefer to use is the fluoride of sodium, because it is less absorbent of moisture from the atmosphere than the fluorides of ammonium or of potassium.

As the fluorides of the fixed alkalies are soluble in water, they may be used in that way for painting or sketching the picture or design on the prepared transfer-sheet. In this case it is better to add some vegetable coloring-matter or aniline color to the solution, so that the pattern or drawing may be visible to the eye while being sketched on the transfer-sheet, and so that the purchaser may see the design which he is obtaining; or the ink may be made by triturating the fluorides of the alkalies (which are solids) with some suitable vehicle which will hold them in mixture or suspension, and which will be of sufficient consistency to be used for painting or printing—such, for example, as linseed-oil, Venice turpentine or other resinous varnishes, beeswax, tallow, soap, glycerine, gelatine, boiled starch, mucilage, or other equivalent substance—by which I mean some substance with which the fluoride or fluorides can be intimately mixed, which can be applied to the transfer-sheet by painting, printing, or sketching, which will be removed by evaporation or charring by means of heat and leave the fluoride behind as a filmy deposit, and which will not stain or discolor the glass.

In addition to the fluorides of the alkalies, other fixed alkalies—as carbonates, phosphates, or oleates (soap)—may be added to the ink. These ingredients (as well as the fluorides, whether used separately or not) must be very finely triturated and thoroughly intermixed with the vehicle, so that all portions of the surface to be etched may receive its proportion of fluoride, and that the fluoride may be uniformly distributed. If any portion of the picture or tracing is desired to be more heavily etched, the quantity of fluoride ink applied to such part may be correspondingly increased.

After the design or picture has been applied to the prepared transfer-paper by hand-sketching or painting or by printing, it must then be dried; and when thoroughly dry it may receive a very thin protecting-coat, yet this is not always necessary. If the design or picture is in a fluoride ink the vehicle of which is a resinous or a fatty substance, the protecting-coat may be a thin film of collodion, or of varnish, or of mucilage or starch. If the picture is drawn with an aqueous solution of a fluoride salt, the coating should be a thin film of a resinous solution.

Care must be taken that each of the several films of collodion or of resinous substance, both above or below the picture or design itself, should be as thin as possible, so as to avoid the danger of the lines of the drawing or picture spreading or becoming diffused on the surface of the glass by the evaporation or burning away of the substances other than the fluoride which compose the transfer-sheets.

When the transfer pictures or designs are to be used for decorating china-ware, the sheet on which the decoration is to be sketched, painted, or printed is prepared in any of the ways hereinbefore described; but instead of the fluoride ink or pigment used when the purpose is to etch glass, the ordinary mineral colors, which can be fused onto the surface of the china or porcelain, are employed; and when the colors are dry the transfer pictures or patterns are ready for use.

The method of applying these transfer-pictures is as follows: The surface to which the transfer-picture is applied is made perfectly clean, and then a thin coat of some transparent quick-drying varnish—such, for example, as Vacquerel's varnish—is applied, either to the surface of the glass or to both the object and the picture. If the transfer-picture has been prepared without a protecting-cover, and if the paper on which it is produced is thoroughly pliable, then the picture itself will need no varnishing before being pressed upon the varnished surface to which it is applied. If, on the other hand, the transfer-sheet has received a coat of varnish, then both the picture and the object should be varnished. The transfer-picture is then closely pressed down on the surface of the glass with the picture side down, so that no air-bubbles may be interposed between the two surfaces, and that a perfect contact and adhesion may be secured. The next thing to be done is to remove from the surface of the glass every substance which composed the picture excepting the fluorides. If the transfer-picture is made as, first before described, with a film of mucilage between the paper and the picture, the article of glass-ware is immersed in water for a sufficient time (ten minutes, more or less) to cause the mucilage to dissolve, when the paper will separate from the glass, and, floating away, will leave the picture or design on the glass, protected by a film of collodion. The glass, with the picture closely adhering to it, is then carefully and thoroughly dried, so as to remove all aqueous moisture, and is ready for the next stage of the process.

If the transfer-picture used is made on a collodion base or on Japanese fiber paper, or otherwise, as before described, than with a base of mucilaged paper, the article of glassware needs no further preparation before proceeding to the next stage of the process. The article of glass, with the transfer-picture adhering to it, is then placed in a suitable furnace, where it is exposed to a slowly and gradually increasing heat until the heat rises to about 250° Fahrenheit. It is kept at that temperature for about one hour, during which time the volatile particles of the collodion and varnish pass away. The heat is then gradually raised to about 750°, so as to cause the more solid constituents of the varnish and collodion to pass off without blistering, and the heat is then still further raised until all the charred matter, chiefly carbon, has disappeared, leaving only the film of fluoride on the glass. The heat is then raised up to a dull red, at which temperature the desired reaction takes place between the fluorine of sodium and the silica of the glass, causing the glass to be eaten away, and the effect of etching is produced. Care must be taken not to raise the heat higher than is necessary to produce the required reaction, nor to expose the glass to such heat longer than necessary, as the opacity thus produced by the fluoride of the fixed alkalies passes off, and the etched surface assumes a blistered and frozen appearance if the heat is too great or too long continued. Experience will soon make a skilled workman to determine when to commence to reduce the temperature of the furnace. This should be done gradually until it becomes cold, and then the process is completed.

Instead of producing the required reaction between the fluoride of sodium and the glass by means of furnace heat, it may be done by other means, as described in one of my other specifications before referred to. In this case the increase of heat of the furnace is arrested at the point where all the components of the transfer-picture, excepting the fluoride deposited on the glass, has been removed by heat, as before described, and the furnace having been gradually cooled down the glass article is removed, and is then exposed to the heated fumes or vapors of sulphuric acid until the desired etching effect is produced. This may be done in the same oven, and thus the danger of any portion of the deposit falling from the surface of the glass will be greatly lessened. This method of producing the desired reaction by means of sulphuric-acid vapor does not, however, give as good results as when heat only is used, as the opacity produced by the sulphuric-acid vapor is not decided.

Any competent means may be used for producing the reaction between the film of fluoride of sodium or of other fixed alkali deposited on the surface of the glass and the silicon of the glass, as my invention designed to be covered by this patent has reference to the preparing of transfer pictures and designs and the application of fluorides of fixed alkalies to glassware for the purpose of etching by means of such transfer-pictures.

During that part of the process when the glass is subjected to the preliminary heating to remove the carbonaceous and ashy matters of the transfer-pictures it may be well to place the articles as far as possible in a horizontal position, so that the ashy matter may not fall down over the surfaces to be etched or decorated, as that might have a tendency to derange the particles of fluoride deposited on the glass or of coloring-matter deposited on the china, and thus blur or deface the design.

Having thus described my invention, what I claim as new, and desire to secure by Letters Patent, is—

1. The process of etching glassware by applying to its surface transfer-sheets on which the required design is printed, sketched, or painted with a composition or mixture containing the fluoride of sodium or other fluoride of fixed alkali, and then exposing the glass so prepared to heat sufficient to remove the component parts of such transfer-sheet other than the fluoride, and then producing a chemical reaction between the deposited film of fluoride and the silica of the glass by means of the gradual application of a further degree of heat or other equivalent means, substantially as described.

2. The method of preparing transfer pictures and designs for depositing on the surface of glassware to be etched a thin film of the fluoride of sodium or fluoride of other fixed alkali by drawing, painting, or printing on a sheet of fibrous material or of collodion, or other equivalent combustible fabric, the desired picture, decoration, or design with an aqueous solution of such fluoride, or with an ink or pigment containing the same, and protecting the surface of such design or picture with a coating of collodion or resinous varnish or its equivalent, substantially as described.

3. As a new article of manufacture, sheets of thin combustible, reticulated, or woven material—such as cotton or silk blonde, or Japanese fiber paper—the interstices of which are filled with a film of collodion or other equivalent combustible, fusible, or volatile substance, substantially as and for the purposes described.

4. As a new article of manufacture, sheets of thin combustible, reticulated, or woven material—such as cotton or silk blonde—the interstices of which are filled with a film of collodion or equivalent combustible, fusible, or volatile substance, on which are painted, printed, or otherwise impressed designs for decorating glass with an ink or pigment containing the fluoride of a fixed alkali or a solution thereof, and protected on the outer surface with a film of collodion or resinous varnish or its equivalent, made substantially as described.

5. As a new article of manufacture, transfer-sheets for transferring to the surface of glassware designs to be etched thereon, such sheets consisting of Japanese fiber paper or equivalent thin fibrous material, on which are painted, printed, or sketched the required design with an ink or pigment containing fluoride of sodium or its equivalent, and with or without a protecting-coating of collodion or varnish, substantially as described.

In testimony whereof I have hereunto set my hand this 26th day of October, A. D. 1882.

HERMANN SCHULZE-BERGE.

Witnesses:
   T. B. KERR,
   W. B. CORWIN.